(12) United States Patent
Pistorino et al.

(10) Patent No.: US 10,622,672 B2
(45) Date of Patent: Apr. 14, 2020

(54) CERAMIC-POLYMER COMPOSITE ELECTROLYTES FOR LITHIUM POLYMER BATTERIES

(71) Applicant: Seeo, Inc., Hayward, CA (US)

(72) Inventors: Jonathan C. Pistorino, Oakland, CA (US); Hany Basam Eitouni, Oakland, CA (US); Russell Clayton Pratt, San Mateo, CA (US); Mohit Singh, Santa Clara, CA (US)

(73) Assignee: SEEO, INC, Hayward, CA (US)

( * ) Notice: Subject to any disclaimer, the term of this patent is extended or adjusted under 35 U.S.C. 154(b) by 435 days.

(21) Appl. No.: 15/393,217

(22) Filed: Dec. 28, 2016

(65) Prior Publication Data

US 2017/0187063 A1 Jun. 29, 2017

Related U.S. Application Data

(60) Provisional application No. 62/370,705, filed on Aug. 3, 2016, provisional application No. 62/272,012, filed on Dec. 28, 2015.

(51) Int. Cl.
*H01M 10/056* (2010.01)
*H01M 10/052* (2010.01)
*H01M 10/0525* (2010.01)

(52) U.S. Cl.
CPC ....... *H01M 10/056* (2013.01); *H01M 10/052* (2013.01); *H01M 10/0525* (2013.01); *H01M 2300/0068* (2013.01); *H01M 2300/0071* (2013.01); *H01M 2300/0082* (2013.01); *H01M 2300/0091* (2013.01)

(58) Field of Classification Search
CPC ............ H01M 10/056; H01M 10/052; H01M 10/0525
See application file for complete search history.

(56) References Cited

U.S. PATENT DOCUMENTS

| 7,318,982 B2 | 1/2008 | Gozdz et al. |
| 8,268,197 B2 | 9/2012 | Singh et al. |
| 8,563,168 B2 | 10/2013 | Balsara et al. |

(Continued)

FOREIGN PATENT DOCUMENTS

| CN | 101630729 B | 3/2011 |
| EP | 1763099 A2 | 3/2007 |

(Continued)

OTHER PUBLICATIONS

Li et al. ("Mixed (electronic and ionic) conductive solid polymer matrix", published 1991, pp. 3043-3050).

(Continued)

*Primary Examiner* — Jimmy Vo
(74) *Attorney, Agent, or Firm* — Brooks Kushman P.C.

(57) ABSTRACT

Composites of lithium-ion-conducting ceramic and polymeric materials make superior separators and electrolytes for use in lithium batteries. The ceramic material provides a high conductivity pathway for lithium-ions, enhancing the properties of the less conductive polymeric material. The polymeric material provides flexibility, binding, and space-filling properties, mitigating the tendency of rigid ceramic materials to break or delaminate. The interface between the polymer and ceramic can be made to have a low ionic resistance through the use of additives and coatings.

19 Claims, 7 Drawing Sheets

(56) References Cited

U.S. PATENT DOCUMENTS

| | | |
|---|---|---|
| 8,598,273 B2 | 12/2013 | Eitouni et al. |
| 8,691,928 B2 | 4/2014 | Hsieh et al. |
| 8,889,301 B2 | 11/2014 | Balsara et al. |
| 9,048,507 B2 | 6/2015 | Eitouni et al. |
| 9,136,562 B2 | 9/2015 | Singh et al. |
| 2002/0034583 A1 | 3/2002 | Jung |
| 2003/0024816 A1 | 2/2003 | Aritomi et al. |
| 2004/0029014 A1 | 2/2004 | Hwang et al. |
| 2009/0075176 A1 | 3/2009 | Singh et al. |
| 2011/0003211 A1 | 1/2011 | Hudson et al. |
| 2011/0117432 A1 | 5/2011 | Kay |
| 2011/0281175 A1 | 11/2011 | Hudson |
| 2012/0141881 A1 | 6/2012 | Geier et al. |
| 2014/0178775 A1 | 6/2014 | Lee et al. |
| 2015/0155592 A1 | 6/2015 | Pratt |

FOREIGN PATENT DOCUMENTS

| | | |
|---|---|---|
| JP | 2007087938 A | 4/2007 |
| JP | 2010192258 A | 9/2010 |
| JP | 2011034870 A | 2/2011 |
| JP | 2011119158 A | 6/2011 |
| JP | 2015176857 A | 10/2015 |
| KR | 100373835 B1 | 2/2003 |
| KR | 100589307 B1 | 6/2006 |
| WO | 2009146340 A1 | 12/2009 |
| WO | 2010083325 A1 | 7/2010 |
| WO | 2010083330 A1 | 7/2010 |
| WO | 2014051032 A1 | 8/2016 |

OTHER PUBLICATIONS

Machine translation of CN101630729.
KR100589307B1 Machine Translation.
KR100373835B1 Machine Translation.
International Search Report for PCT application PCT/US2016/069041, dated Mar. 16, 2017.
Raghavan et al., "Electrochemical performance of electrospun poly(vinylidene fluoride-co-hexafluoropropylene)-based nanocomposite polymer electrolytes incorporating ceramic fillers and room temperature ionic liquid", Electrochimica Acta, May 18, 2009, United Kingdom, 8 pages.
European Search Report for Application No. EP 16882617.0, dated Jul. 3, 2019, 7 pages.

CERAMIC-POLYMER COMPOSITE ELECTROLYTES FOR LITHIUM POLYMER BATTERIES

CROSS-REFERENCE TO RELATED APPLICATIONS

This application claims priority to U.S. Provisional Patent Application 62/272,012, filed Dec. 28, 2015 and to U.S. Provisional Patent Application 62/370,705, filed Aug. 3, 2016, both of which are incorporated by reference herein.

BACKGROUND

Field of the Invention

This invention relates generally to electrolyte materials for battery cells, and, more specifically, to ceramic-polymer composite materials for use as separator electrolytes and as catholytes for lithium battery cells.

Ceramic and polymeric materials have been developed as solid-state alternatives to conventional lithium ion conducting solvent-containing separators in lithium batteries. But ceramics and polymers each have their own characteristic difficulties and failure modes. Ceramic materials can be difficult to process into films thin enough for use in batteries. In addition, they are brittle, so that expansion and contraction during battery cycling can cause them to break apart or to delaminate from adjacent battery structures. Polymeric materials can have low ionic conductivities at ambient temperatures. They also tend to be soft, which can allow growth of lithium dendrites during battery cycling.

It would be very useful to find a way to exploit the benefits of both ionically-conductive polymers and ionically-conductive ceramic materials for use in lithium batteries.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

A ceramic-polymer composite electrolyte material is disclosed. The material includes ionically-conductive ceramic particles distributed in a matrix of ionically-conductive solid polymer and a chemical additive to form a ceramic-polymer composite. The chemical additive is configured to reduce ionic resistance at interfaces between the ceramic particles and the ionically-conductive solid polymer.

In one embodiment of the invention, the ionically-conductive ceramic particles may be any of LIPON, LLTO, LATP, LISICON, LLZO, LSPS, thio-LISICON, and/or $Li_2S$—$P_2S_5$.

In various embodiments, the ionically-conductive ceramic particles have an average diameter less than 20 µm, less than 10 µm, or between 0.2 and 1.0 µm.

In one arrangement, the ionically-conductive solid polymer may be one or more of polyethers, polyamines, polyimides, polyamides, poly alkyl carbonates, polynitriles, perfluoro polyethers, fluorocarbon polymers substituted with nitriles, fluorocarbon polymers substituted with carbonates, or fluorocarbon polymers substituted with sulfones. The ionically-conductive solid polymer may be crosslinked.

In one arrangement, the ionically-conductive solid polymer is a graft copolymer that may be one or more of polysiloxanes, polyphosphazines, polyolefins, or polydienes. The ionically-conductive solid polymer may be crosslinked.

In one arrangement, the ionically-conductive solid polymer is a block copolymer that contains ionically-conductive blocks that make up ionically-conductive phases and structural blocks that make up structural phases.

In various arrangements, the weight fraction of ceramic particles in the electrolyte is between 10% and 80%, between 30% and 60%, or between 50% and 55%.

In one embodiment of the invention, the ceramic-polymer composite has an area specific impedance between the ionically-conductive ceramic particles and the ionically-conductive solid polymer that is less than 1500 ohm*cm$^2$.

In one arrangement, the chemical additive is may be any of urethane functionalized poly(ethylene glycol); urethane functionalized perfluoropolyether; alkyl substituted pyridinium-based ionic liquids with TFSI, PF$_6$, or BF$_4$ anions; alkyl substituted pyrrolidinium-based ionic liquids with TFSI, PF$_6$, or BF$_4$ anions; substituted poly(ethylene glycol) with functional carbonate end groups; substituted poly(ethylene glycol) with functional nitrile end groups; dioctyl sulfosuccinate sodium, lithium, or potassium salts; poly (ethylene glycol) 4-nonylphenyl 3-sulfopropyl ether sodium, lithium, or potassium salts; sodium, lithium, or potassium dodecylbenzenesulfonate; alkyl substituted phosphonium-based ionic liquids with TFSI, PF$_6$, or BF$_4$ anions; alkyl substituted imidazolium-based ionic liquids with TFSI, PF$_6$, or BF$_4$ anions; and alkyl substituted ammonium-based ionic liquids with TFSI, PF$_6$, or BF$_4$ anions.

In another arrangement, the chemical additive is may be any of α,ω-bis(N,N-dialkylcarbamoyl) poly(ethylene glycol); α,ω-bis(N,N-dialkylcarbamoyl) poly(ethylene oxide); α,ω-bis(N,N-dialkylcarbamoyl) poly(difluoromethylene oxide-co-tetrafluoroethylene oxide); 1-butyl-4-methylpyridinium tetrafluoroborate; 1-butyl-3-methylpyridinium tetrafluoroborate; 1-butyl-2-methylpyridinium tetrafluoroborate; 1-butylpyridinium tetrafluoroborate; 1-hexylpyridinium tetrafluoroborate; 1-butyl-1-methylpyrrolidinium tetrafluoroborate; 1-ethyl-1-methylpyrrolidinium tetrafluoroborate; 1-butyl-1-methylpyrrolidinium bis(fluorosulfonyl)imide; 1-butyl-1-methylpyrrolidinium tris-(pentafluoroethyl)trifluorophosphate; 1-methyl-1-octylpyrrolidinium bis(trifluoromethylsulfonyl)imide; 1-methyl-1-propylpyrrolidinium hexafluorophosphate; 1-methyl-1-propylpyrrolidinium bis(trifluoromethylsulfonyl)imide; 1-methyl-3-propylpyrrolidinium bis(trifluoromethyl sulfonyl)imide; 1-hexyl-1-methylpyrrolidinium bis(trifluoromethyl sulfonyl)imide; 1-hexyl-1-methylpyrrolidinium tetrafluoroborate; α,ω-bis (alkylcarboxy) poly(ethylene glycol); α,ω-bis(alkylcarboxy) poly(ethylene oxide); poly(ethylene glycol) bis(carboxymethyl) ether; α,ω-bis(cyanoalkyl) poly(ethylene glycol); α,ω-bis(dicyanoalkyl) poly(ethylene glycol); dioctyl sulfosuccinate sodium salts; dioctyl sulfosuccinate lithium salts; dioctyl sulfosuccinate potassium salts; poly (ethylene glycol) 4-nonylphenyl 3-sulfopropyl ether sodium salt; poly(ethylene glycol) 4-nonylphenyl 3-sulfopropyl ether lithium salt; poly(ethylene glycol) 4-nonylphenyl 3-sulfopropyl ether potassium salt; sodium dodecylbenzenesulfonate; lithium dodecylbenzenesulfonate; potassium dodecylbenzenesulfonate; trihexyltetradecylphosphonium bis(trifluoromethylsulfonyl)imide; 1,3-dimethylimidazolium bis(trifluoromethylsulfonyl)imide; tetrabutylammonium bis(trifluoromethylsulfonyl)imide; glycolic acid ethoxylate 4-tert-butylphenyl ether; glycolic acid ethoxylate lauryl ether; glycolic acid ethoxylate 4-nonylphenyl ether; glycolic acid ethoxylate oleyl ether; alkylurethane; 1-methyl-3-pyrrolidinone; 1,3-dimethyl-3,4,5,6-tetrahydro-2(1H)-pyrimidinone; and 1,5-dimethyl-2-pyrrolidinone.

In one arrangement, the weight fraction of the additive in the ionically-conductive solid polymer alone (before the ceramic particles are added) is between 1 and 30%.

In one embodiment of the invention, the ceramic particles are precoated with a material that may be any of graphite, lithium fluoride, lithium phosphate, zirconium oxide, barium titanate, ionic surfactants, alkyl nitriles, alkyl carbonates, or alkyl sulfone functional groups.

In one embodiment of the invention, an electrolyte material includes a solid polymer electrolyte comprising polystyrene-poly(ethylene oxide) block copolymer, LiTSFI, and urethane-functionalized poly(ethylene glycol), in which electrolyte ionically-conductive LISICON ceramic particles are distributed.

In another embodiment of the invention, an electrolyte material includes a solid polymer electrolyte comprising poly(ethylene glycol) dimethyl ether, LiTFSI, and poly (ethylene glycol) bis(carboxymethyl) ether, in which electrolyte ionically-conductive LLTO ceramic particles are distributed.

DETAILED DESCRIPTION

The preferred embodiments are illustrated in the context of electrolytes for lithium batteries or electrochemical cells. The skilled artisan will readily appreciate, however, that the materials and methods disclosed herein will have application in a number of other contexts where good ionic conduction in a material that is both flexible and hard is desirable.

These and other objects and advantages of the present invention will become more fully apparent from the following description taken in conjunction with the accompanying drawings.

In this disclosure, the terms "negative electrode" and "anode" are both used to mean "negative electrode". Likewise, the terms "positive electrode" and "cathode" are both used to mean "positive electrode".

It is to be understood that the terms "lithium metal" or "lithium foil," as used herein with respect to negative electrodes, are meant to include both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C, Li—Mg or any other Li-metal alloy suitable for use in lithium metal batteries. Other negative electrode materials that can be used in the embodiments of the invention include materials in which lithium can intercalate, such as graphite.

The term "solid polymer electrolyte" is used throughout this disclosure. Various details about the compositions of such electrolytes are given herein. It should be understood that such electrolytes often contain electrolyte salts, such as lithium salts, even if it is not stated explicitly.

There are no particular restrictions on the electrolyte salt that can be used in the solid polymer electrolytes. Any electrolyte salt that includes a lithium ion can be used. It is especially useful to use electrolyte salts that have a large dissociation constant within the polymer electrolyte. Examples of such salts include $LiPF_6$, $LiN(CF_3SO_2)_2$, $Li(CF_3SO_2)_3C$, $LiN(SO_2CF_2CF_3)_2$, $LiB(C_2O_4)_2$, and mixtures thereof.

Many embodiments described herein are directed to electrolytes that contain ionically-conductive, solid polymer electrolytes. In various arrangements, the solid polymer electrolyte can be a dry polymer electrolyte, a block copolymer electrolyte and/or a non-aqueous electrolyte. As is well known in the art, batteries with liquid electrolytes use an inactive separator that is distinct from the liquid electrolyte.

In one embodiment of the invention, composites of lithium-ion-conducting ceramic and polymeric materials make superior separators for use in lithium batteries. Ceramic material particles provide high conductivity pathways for lithium-ions, enhancing the conductivity of the composite as compared to the less ionically-conductive polymeric material. The polymeric material provides flexibility, binding, and space-filling properties, mitigating the tendency of rigid ceramic materials to break or delaminate. The interface between the polymer and ceramic can be made robust and less resistive through the use of additives.

When a liquid electrolyte (with a separator membrane such as Celgard®) or a soft polymer electrolyte is used as the separator in a battery that has a lithium metal or metal alloy anode, dendrites can form and grow easily. Over several battery charge/discharge cycles, particularly when the battery is cycled at a fast rate, lithium dendrites begin to nucleate at the surface of the anode and grow through the separator until they reach the cathode. An electrical current passing through such dendrites can short-circuit the battery, causing it to rapidly overheat and fail, often catastrophically.

Solid layers of ionically-conductive ceramic material have been used as separators in an effort to prevent dendrite formation and growth. In general, such materials have high ionic conductivities—higher than the ionic conductivities of solid polymer electrolytes, especially at ambient temperatures (such as around 20° C.). Such materials can also prevent dendrite growth (with elastic moduli on the order of $10^{10}$ Pa), but it has been difficult to get and maintain good adhesion between the ceramic separator and the metal anode as the battery cycles. Forming a dense ceramic layer has also proven to be a challenge. In addition, ceramic separators are very brittle and often break apart as a battery is processed or cycled. If cracks or micro-cracks are present in the ceramic separator, lithium dendrites can follow the cracks and short circuit the cell. To date most processing of dense ceramic films is done through sputtering or high temperature/pressure molding of small disks. Both methods present large hurdles to large scale manufacturing of battery cells.

On the other hand, an ionically-conductive solid polymer electrolyte has flexibility and space-filling properties that adapt to changing dimensions in a cycling battery. Polymers can maintain good adhesive contact with ceramic particles, active material particles, electronically conductive particles, current collectors, and other components of the cell. But polymer electrolytes (with elastic moduli on the order of $10^6$ Pa), by themselves, offer little protection against dendrite growth. As both polymer and ceramic particles can conduct lithium ions, a composite electrolyte does not suffer from ionic resistance increases as does a pure ceramic conductor, even if some components of the cell undergo cracking or dimensional changes with time.

It has been found that there are advantages for a lithium battery (or other electrochemical cell) that uses a composite electrolyte made from a combination of ceramic particles in a solid polymer matrix. Ceramic particles provide higher ionic conductivity and higher $Li^+$ transference number than do polymer electrolytes, and they are tough enough that they can block growth of dendrites. Such a polymer provides a good matrix into which ceramic particles can be embedded. The polymer has flexibility and good adhesion with the embedded ceramic particles and with adjoining battery cell components. The ceramic particles are well-supported by the polymer matrix and are small enough that they are not likely to break apart during battery cycling.

A composite electrolyte can have a conductivity roughly equal to the weighted conductivities of the polymer and ceramic, weighted by their respective volume fraction in the composite. The $Li^+$ transference number of the composite can be determined similarly from the $Li^+$ transference numbers of the two components. In general, $Li^+$ transference numbers for ceramic ionic conductors are nearly 1, whereas the $Li^+$ transference numbers for ionically-conductive polymers are much less. Thus, the $Li^+$ transference number for a ceramic-polymer composite electrolyte increases as the ceramic fraction of the composite increases. For example when 20 volume % polymer electrolyte ($Li^+$ transference number of 0.25) is combined with 80 volume % ceramic ionic conductor ($Li^+$ transference number of 1), the composite ceramic polymer electrolyte would be expected to have a $Li^+$ transference number of about 0.85. Similarly, a composite of the same materials with 67 volume % polymer electrolyte and 33 volume % ceramic would be expected to have a $Li^+$ transference number of about 0.5.

In one embodiment of the invention, a ceramic-polymer composite is used as the cathode electrolyte (catholyte). The ceramic-polymer composite can be formed using a polymer electrolyte that is either a block copolymer, a copolymer, or a homopolymer(s). The separator used with such a catholyte may be the same material or it may be different. The separator may be a homopolymer, a mixture of homopolymers, a block copolymer, a copolymer, or a liquid electrolyte used with a traditional separator membrane. If both the catholyte and the separator electrolyte are made of polymers with ceramic particles, each may still be chosen independently with different polymers and different ceramics. It is important to choose an electrolyte suitable for each application, taking into consideration such properties as voltage stability, chemical stability, ionic conductivity, and electrical conductivity.

Figure 1:
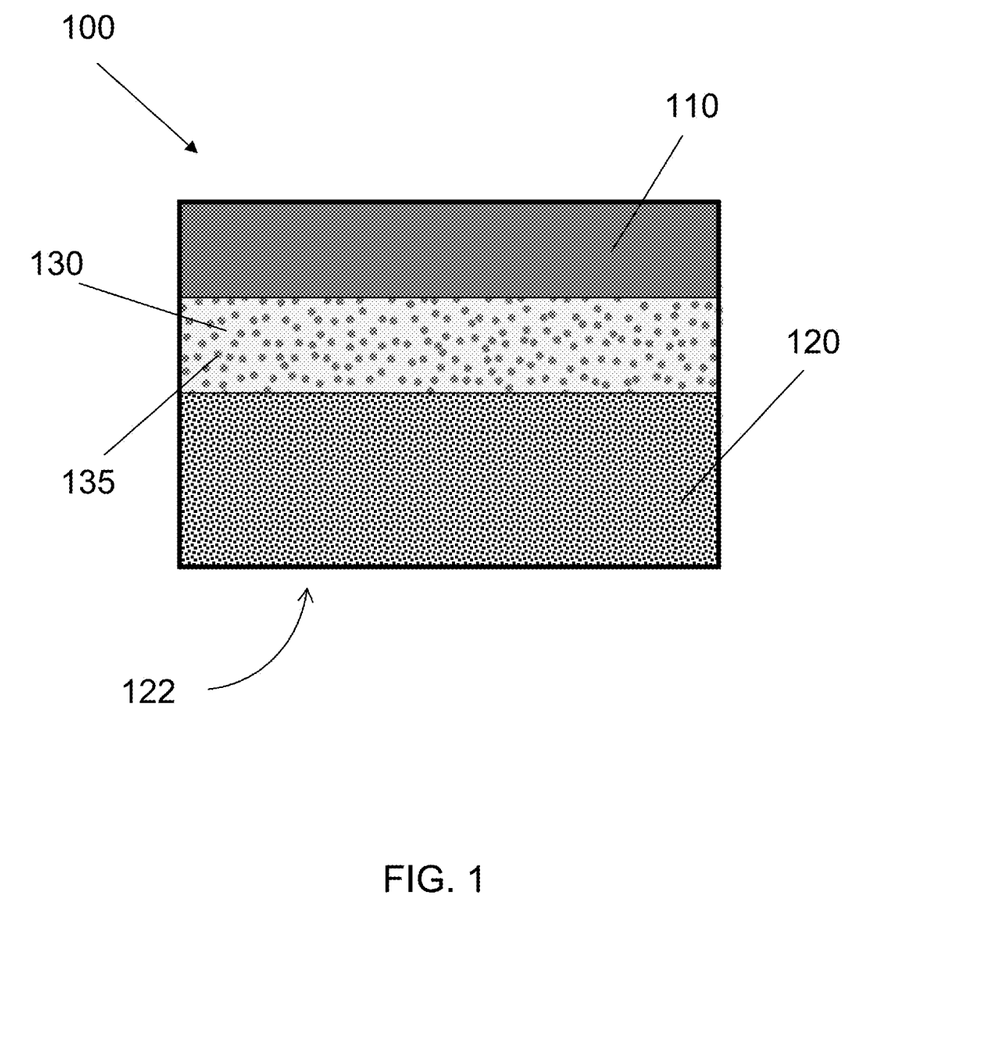
FIG. 1 is a schematic illustration of lithium battery cell, according to an embodiment of the invention.

FIG. 1 is a cross-sectional schematic drawing of an electrochemical cell 100 with an anode 110, a cathode 120, and a separator 130 according to an embodiment of the invention. The negative electrode 110 is a negative electrode film made of lithium metal or one or more lithium alloys, such as those listed above.

The positive electrode 120 has positive electrode active material particles embedded in a matrix of solid polymer electrolyte (catholyte) that may also contains small, electronically-conductive particles (not shown) such as carbon black. The solid polymer catholyte can be a polymer, a copolymer, or a blend thereof. In one arrangement, the solid polymer catholyte is a block copolymer electrolyte. In one arrangement, the solid polymer catholyte is a ceramic-polymer composite electrolyte, as described herein. This can be particularly advantageous because it is often the cathode that is rate limiting in a battery or electrochemical cell. The inclusion of ionically-conductive ceramic particles in the catholyte increases the ionic conductivity of the cathode, thus increasing the overall rate performance of the cell. There may be a positive electrode current collector (not shown) that may be a continuous or reticulated metal film in electronic contact with the outer surface of the positive electrode 120.

Figure 2:
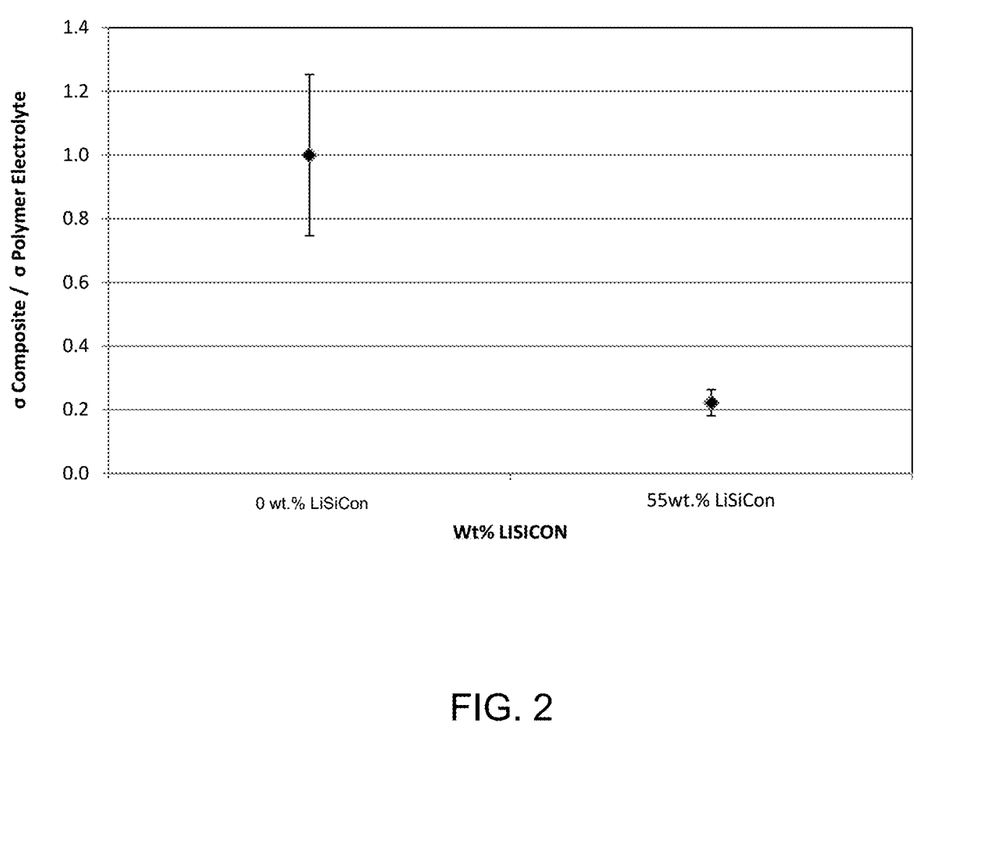
FIG. 2 is a graph that shows conductivity data for a ceramic-polymer composite electrolyte that has significant interface ionic resistance between the solid polymer electrolyte and the ionically-conductive LISICON ceramic particles.
Figure 3:
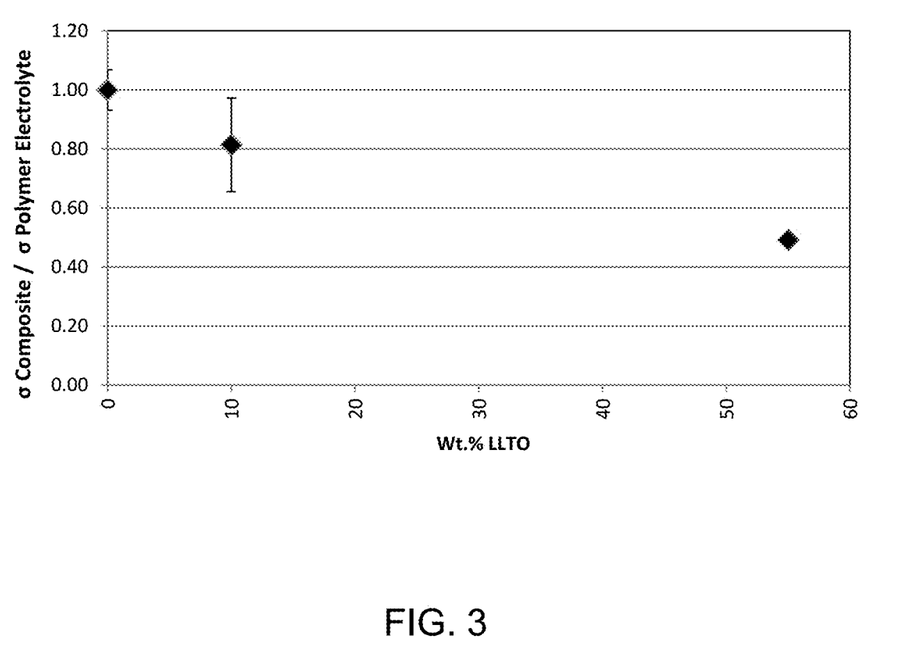
FIG. 3 is a graph that shows conductivity data for a ceramic-polymer composite electrolyte that has significant interface ionic resistance between the solid polymer electrolyte and the ionically-conductive LLTO ceramic particles.

In one arrangement, the separator 130 contains a ceramic-polymer composite electrolyte, as described herein and may or may not be the same solid electrolyte as is used in the positive electrode 120. The inclusion of ionically-conductive ceramic particles 135 may retard formation and/or growth of dendrites from the anode, as discussed above, as well as increase the ionic conductivity of the separator as compared to a solid polymer electrolyte without the ceramic particles. In other arrangements, the separator 130 may contain a homopolymer, a mixture of homopolymers, a block copolymer, a copolymer, or a liquid electrolyte used with a traditional separator membrane Initial attempts at creating a ceramic-polymer composite electrolyte by distributing conductive ceramic particles in a polymer matrix did not have the desired outcome, as conductivities for the composites were at or below that of the solid polymer electrolyte alone. Both FIGS. 2 and 3 show the ratio of the conductivity of a ceramic-polymer composite electrolyte to the conductivity of the solid polymer electrolyte alone as a function of the weight fraction of the ionically-conductive ceramic particles. FIG. 2 is a graph that shows conductivity data for a ceramic-polymer composite electrolyte that contains ionically-conductive LISICON ceramic particles. FIG. 3 is a graph that shows conductivity data for a ceramic-polymer composite electrolyte that contains ionically-conductive LLTO ceramic particles. Without desiring to be bound to any particular theory, it may be that the interfaces between the solid polymer electrolyte and the ionically-conductive ceramic particles introduce additional ionic resistance to the composite. For example, if there were poor adhesion or poor charge transfer between the solid polymer electrolyte and the conductive ceramic particles, there would be increased ionic resistance at their interfaces.

Figure 4A:
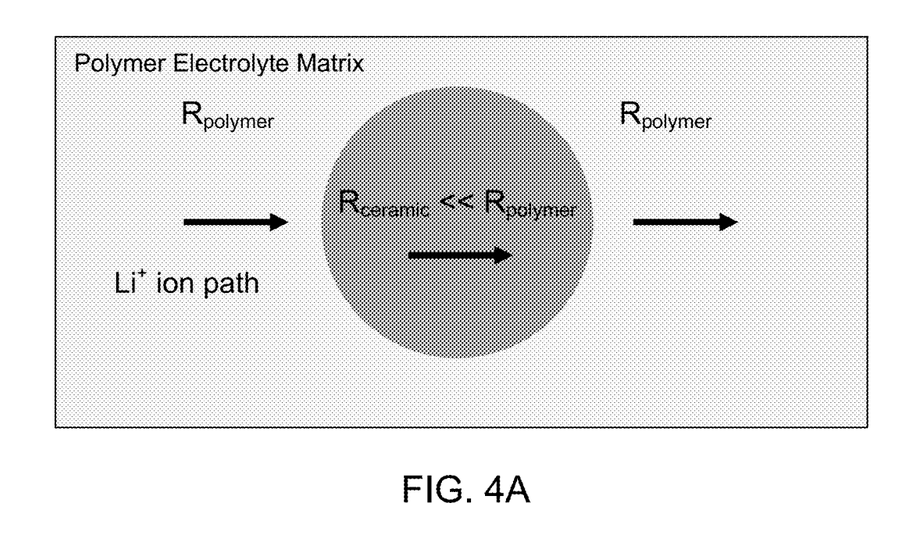
FIG. 4A is a schematic drawing of a desirable path that Li$^+$ ions can take when flowing through a composite electrolyte that has ionically-conductive ceramic particles in a solid polymer electrolyte matrix where there is no significant interface ionic resistance.
Figure 4B:
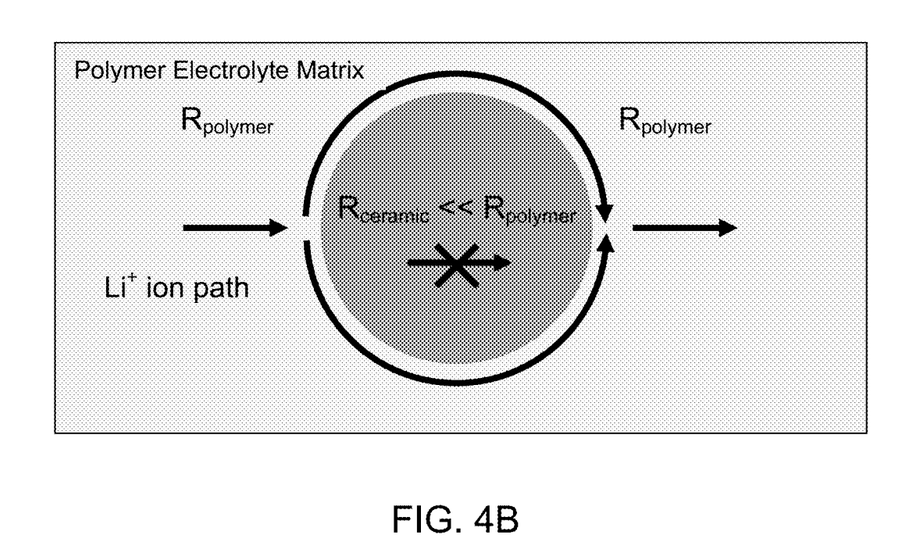
FIG. 4B is a schematic drawing of an undesirable situation for flow of Li$^+$ ions in a composite electrolyte that has ionically-conductive ceramic particles in a solid polymer electrolyte matrix where there is significant interface ionic resistance.

FIGS. 4A and 4B show an ionically-conductive ceramic particle (dark grey) embedded in a solid polymer electrolyte matrix. The ionic resistance (conductivity) is lower (higher) in the ceramic particle than in the polymer matrix. FIG. 4A is a schematic drawing of a desirable path that $Li^+$ ions can take when flowing through a ceramic-polymer composite electrolyte that has ionically-conductive ceramic particles in a solid polymer electrolyte matrix where there is no significant interface ionic resistance. In FIG. 4A, Li$^+$ ions pass from the polymer matrix into the ceramic particle and out again easily. The interface between the polymer matrix and the ceramic particle does not present a barrier to Li$^+$ ion flow; there is no significant interface ionic resistance nor other spurious effects. Thus, the ceramic particle, with its higher ionic conductivity, allows the ceramic-polymer composite electrolyte to have an overall higher ionic conductivity than the solid polymer electrolyte alone.

FIG. 4B is a schematic drawing of an undesirable situation for flow of Li$^+$ ions in a ceramic-polymer composite electrolyte that has ionically-conductive ceramic particles in a solid polymer electrolyte matrix where there is significant interface ionic resistance. In FIG. 4B, Li$^+$ ions cannot pass from the polymer matrix into the ceramic particle. There is so much ionic resistance at the interface between the polymer matrix and the ceramic particle that the ions cannot flow into the particle, but flow around it instead. In this situation, the overall ionic conductivity of the ceramic-polymer composite electrolyte is lower than for the solid polymer electrolyte alone. The ceramic particles merely take up space that is not available for ion flow, reducing the overall effective volume of electrolyte.

In one embodiment of the invention, the ionically-conductive ceramic from which the particles are made contains one or more of LIPON (Lithium phosphorous oxy-nitride), LLTO (lithium lanthanum titanium oxide), LATP (lithium aluminum titanium phosphate), LLZO (lithium lanthanum zirconium oxide), LSPS (lithium tin phosphorus sulfide), thio-LISICON ($Li_{3.25}Ge_{0.25}P_{0.75}S_4$), sulfide glasses such as $Li_2S$—$P_2S_5$, or LISICON (Lithium Super Ionic CONductor), which refers to a family of solids with the chemical formula $Li_{2+2x}Zn_{1-x}GeO_4$). Other possible ionically-conductive ceramics are listed in Table 1. Any ionically-conductive ceramic material may be used in the embodiments of the invention. Many other materials, not listed here, would be known to a person with ordinary skill in the art. In various arrangements, the average diameter of the particles (D50— median diameter) is less than 20 μm, less than 10 μm, or less than 1 μm. In one arrangement, the particle diameter (D50) is between 0.2 and 1 μm. Particle size can be measured using either a surface area approach such as BET (Brunauer, Emmett and Teller) or by light scattering in a particle size analyzer. In one arrangement, the particles have a narrow size distribution with a relative standard deviation less than 20%. In another arrangement, the particle size distribution is multimodal, having two or more modes of distribution. In one arrangement, at least some of the ceramic particles are fused together.

TABLE 1

Exemplary Ceramic Conductors for Use in a Composite Ceramic-Solid Polymer Electrolytes

| Electrolyte Type | Exemplary Formulas | Mixture Proportion |
|---|---|---|
| Oxynitride glass | $Li_xPO_yN_z$ x = 2.9, y = 3.3, z = 0.46  0.24 < z < 1.2 | |
| | $Li_xBO_yN_z$ | |
| Sulfide and oxysulfide glass | $Li_2S \bullet P_2S_5$ | 0.75:0.25 |
| | $Li_2S \bullet SiS_2$ | 0.6:0.4 |
| | $Li_2S \bullet SiS_2 \bullet Li_xMO_4$ M = Si, P, Ge | 0.57:0.38:0.05 |
| | $Li_2S \bullet SiS_2 \bullet Li_3PO_4$ | 0.63:0.36:0.01 |
| | $Li_2S \bullet SiS_2 \bullet xMS_y$ M = Sn, Ta, Ti | 0.6:0.4:0.01-0.05 |
| | $Li_2S \bullet SiS_2 \bullet Li_3N$ | 0.55:0.40:0.03 |
| $Li_{thi}on_{itr}$ide glass | $Li_3N \bullet SiS_2$ | 0.4:0.6 |
| LLTO Perovskite structure (Ohara type) | $La_{2/3-x}Li_{3x}TiO_3$ 0.03 ≤ x ≤ 0.167 | |
| | $La_{1/3-x}Li_{3x}TaO_3$ 0.025 ≤ x ≤ 0.167 | |
| | $La_{1/3-x}Li_{3x}NbO_3$ 0 ≤ x ≤ 0.06 | |
| Nasicon-type (Lisicon) phosphate | $Li_{1.3}Ti_{1.7}Al_{0.3}(PO_4)_3$ | |
| | $LiAlTa(PO_4)_3$ | |
| | $LiAl_{0.4}Ge_{1.6}(PO_4)_3$ | |
| | $Li_{1.4}Ti_{1.6}Y_{0.4}(PO_4)_3$ | |
| | $Li_{3-2x}(Sc_{1-x}M_x)_2(PO_4)_3$ M = Zr, Ti, x = 0.1, 0.2 | |
| | $Li_3Sc_{1.5}Fe_{0.5}(PO_4)_3$ | |

•denotes that components are mixed together

The solid polymer electrolyte may be any such electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. The ionically-conductive linear polymers can also be used in combination as graft copolymers with polysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state. Further information about such block copolymer electrolytes can be found in U.S. Pat. No. 9,136,562, issued Sep. 15, 2015, U.S. Pat. No. 8,889,301, issued Nov. 18, 2014, U.S. Pat. No. 8,563,168, issued Oct. 22, 2013, and U.S. Pat. No. 8,268,197, issued Sep. 18, 2012, all of which are included by reference herein.

The solid polymer electrolyte may be a crosslinked or non-crosslinked polymer material and may contain one or more polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. These polymers can also be used as graft copolymers with polysiloxanes, polyphosphazines, polyolefins, and/or polydienes to form the solid polymer electrolyte.

In one embodiment of the invention, a ceramic-polymer composite electrolyte is made up of ionically-conductive ceramic particles embedded in an ionically-conductive solid polymer matrix that also contains chemical additives that can help to reduce ionic resistance at the interfaces between the solid polymer electrolyte matrix and the ceramic particles. These additives may act to improve ion solvation at the interface between the two conductive phases (polymer and ceramic). Without desiring to be bound to any particular theory, it may be that additives that minimize the dielectric constant difference between the two phases and act to reduce interfacial impedance. Such chemical additives include, but are not limited to, urethane-containing molecules, such as urethane functionalized PEG, urethane functionalized perfluoropolyethers, and alkylurethanes; 1-methyl-3-pyrrolidinone; 1,3-dimethyl-3,4,5,6-tetrahydro-2(1H)-pyrimidinone; 1,5-dimethyl-2-pyrrolidinone; alkyl substituted pyridinium-based ionic liquids, alkyl substituted pryrolidinium-based ionic liquids, and alkyl substituted ammonium-based ionic liquids with counter anions such as TFSI, $PF_6$, $BF_4$ anions; substituted poly(ethylene glycol) with functional end groups such as carbonates (linear or cyclic), carbamates (linear or cyclic), or nitriles; poly(ethylene glycol) bis(carboxymethyl) ether; dioctyl sulfosuccinate sodium, lithium, or potassium salts; glycolic acid ethoxylate 4-tert-butylphenyl ether; glycolic acid ethoxylate lauryl ether; glycolic acid ethoxylate 4-nonylphenyl ether; glycolic acid ethoxylate oleyl ether; poly(ethylene glycol) 4-nonylphenyl 3-sulfopropyl ether sodium, lithium, or potassium salts; and sodium, lithium, or potassium dodecylbenzenesulfonate.

TABLE 2

Exemplary Chemical Additives for Use in Ceramic-Solid Polymer Electrolytes

| Additive | Some Specific Examples |
| --- | --- |
| urethane functionalized poly(ethylene glycol) (PEG) | α,ω-bis(N,N-dialkylcarbamoyl) poly(ethylene glycol) α,ω-bis(N,N-dialkylcarbamoyl) poly(ethylene oxide) |
| urethane functionalized perfluoropolyether | α,ω-bis(N,N-dialkylcarbamoyl) poly(difluoromethylene oxide-co-tetrafluoroethylene oxide) |
| alkyl substituted pyridinium-based ionic liquids with TFSI, $PF_6$, or $BF_4$ anions | 1-butyl-4-methylpyridinium tetrafluoroborate 1-butyl-3-methylpyridinium tetrafluoroborate 1-butyl-2-methylpyridinium tetrafluoroborate 1-butylpyridinium tetrafluoroborate 1-hexylpyridinium tetrafluoroborate |
| alkyl substituted pyrrolidinium-based ionic liquids with TFSI, $PF_6$, or $BF_4$ anions | 1-butyl-1-methylpyrrolidinium tetrafluoroborate 1-ethyl-1-methylpyrrolidinium tetrafluoroborate 1-butyl-1-methylpyrrolidinium bis(fluorosulfonyl)imide 1-butyl-1-methylpyrrolidinium tris-(pentafluoroethyl)trifluorophosphate 1-methyl-1-octylpyrrolidinium bis(trifluoromethylsulfonyl)imide 1-methyl-1-propylpyrrolidinium hexafluorophosphate1-methyl-1-propylpyrrolidinium bis(trifluoromethylsulfonyl)imide 1-methyl-3-propylpyrrolidinium bis(trifluoromethylsulfonyl)imide 1-hexyl-1-methylpyrrolidinium bis(trifluoromethylsulfonyl)imide 1-hexyl-1-methylpyrrolidinium tetrafluoroborate |
| substituted poly(ethylene glycol) with functional carbonate end groups | α,ω-bis(alkylcarboxy) poly(ethylene glycol) α,ω-bis(alkylcarboxy) poly(ethylene oxide) poly(ethylene glycol) bis(carboxymethyl) ether |
| substituted poly(ethylene glycol) with functional nitrile end groups | α,ω-bis(cyanoalkyl) poly(ethylene glycol) α,ω-bis(dicyanoalkyl) poly(ethylene glycol) |
| dioctyl sulfosuccinate sodium, lithium, or potassium salts | dioctyl sulfosuccinate sodium salts dioctyl sulfosuccinate lithium salts dioctyl sulfosuccinate potassium salts |
| poly(ethylene glycol) 4-nonylphenyl 3-sulfopropyl ether sodium, lithium, or potassium salts | poly(ethylene glycol) 4-nonylphenyl 3-sulfopropyl ether sodium salt poly(ethylene glycol) 4-nonylphenyl 3-sulfopropyl ether lithium salt poly(ethylene glycol) 4-nonylphenyl 3-sulfopropyl ether potassium salt |
| sodium, lithium, or potassium dodecylbenzenesulfonate | sodium dodecylbenzenesulfonate lithium dodecylbenzenesulfonate potassium dodecylbenzenesulfonate |
| alkyl substituted phosphonium-based ionic liquids with TFSI, $PF_6$, or $BF_4$ anions | trihexyltetradecylphosphonium bis(trifluoromethylsulfonyl)imide |
| alkyl substituted imidazolium-based ionic liquids with TFSI, $PF_6$, or $BF_4$ anions | 1,3-dimethylimidazolium bis(trifluoromethylsulfonyl)imide |

TABLE 2-continued

Exemplary Chemical Additives for Use in Ceramic-Solid Polymer Electrolytes

| Additive | Some Specific Examples |
|---|---|
| alkyl substituted ammonium-based ionic liquids with TFSI, $PF_6$, or $BF_4$ anions | tetrabutylammonium bis(trifluoromethylsulfonyl)imide |
| surfactants | glycolic acid ethoxylate 4-tert-butylphenyl ether |
| | glycolic acid ethoxylate lauryl ether |
| | glycolic acid ethoxylate 4-nonylphenyl ether |
| | glycolic acid ethoxylate oleyl ether |
| other | alkylurethane |
| | 1-methyl-3-pyrrolidinone |
| | 1,3-dimethyl-3,4,5,6-tetrahydro-2(1H)-pyrimidinone |
| | 1,5-dimethyl-2-pyrrolidinone |

In another embodiment of the invention, the ceramic particles are precoated with materials that have a low interfacial impedance with both the ceramic particles and the polymer electrolyte, creating an ionically conductive bridge between the two conductors. Such coatings may or may not have high ionic conductivity themselves. But, especially for coatings whose ionic conductivity is not very high, it is useful if the coating thickness is very thin. Exemplary coating materials include, but are not limited to, graphite, lithium fluoride, lithium phosphate, zirconium oxide, barium titanate, ionic surfactants, and grafted organic species, such as alkyl nitriles, alkyl carbonates, and alkyl sulfone functional groups.

In various embodiments, the weight fraction of ceramic particles in the ceramic-polymer composite electrolyte is between 10 and 80%, between 20 and 70%, between 30 and 60%, or between 50 and 55%. Correspondingly, the fraction of ceramic particles in the ceramic-polymer composite electrolyte can be expressed in volume percentages through conversions using the densities of the components. There can be chemical additives in the ceramic-polymer composite electrolyte at various concentrations so as long as the polymer is still solid. The amount of chemical additive is expressed as a weight fraction of the ionically conductive polymer and any electrolyte salt in the polymer (before the ceramic particles are added). Typical weight fractions for the additive are in the range between 1 and 30% or between 5 and 20%.

In one embodiment, a ceramic-polymer composite electrolyte is used in conjunction with an additional polymer binder in an electrode, such as a cathode. The additional polymer binder may help to bind together the various components of the electrode. Such a polymer binder may or may not be ionically conductive. It is useful if such a polymer binder has very high mechanical strength and/or good adhesive properties. Examples of such binders include, but are not limited to, polyvinylidene difluoride (PVDF), styrene-butadiene rubber (SBR), and carboxymethyl cellulose (CMC).

Figure 5:
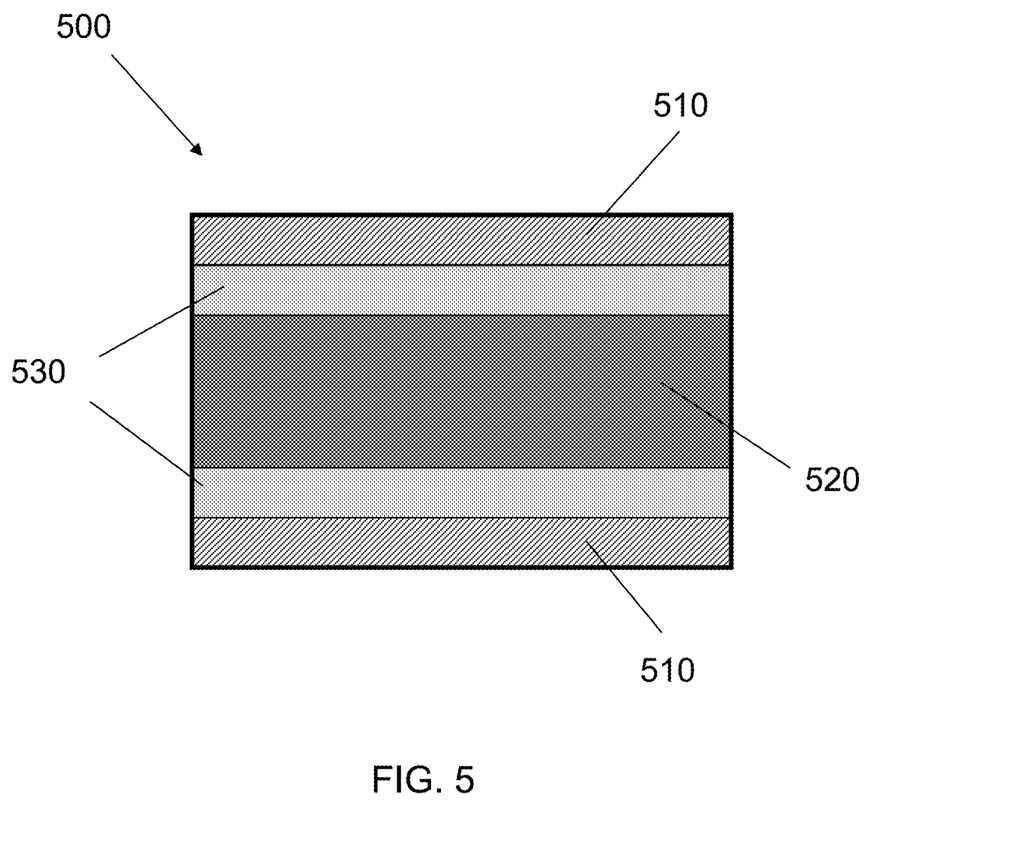
FIG. 5 is a schematic drawing of a sandwich cell that was used to study resistive interfaces between a solid polymer electrolyte and an ionically-conductive ceramic.

FIG. 5 is a schematic drawing of a sandwich cell 500 that was used to study the resistive interface between a solid polymer electrolyte and an ionically-conductive ceramic. The cell 500 has a central portion 520 that contains a layer of ionically-conductive ceramic or ceramic single ion conductor. On either side of the ceramic layer 520 there is a layer 530 of a solid polymer electrolyte. And on either outer surface of the solid polymer electrolyte layers 530, there is a lithium or aluminum current collector 510. To determine the ionic resistance of the ceramic 520—solid polymer electrolyte 530 interfaces, lithium ions were forced to pass through a first solid polymer layer 510, a polymer/ceramic interface, the ceramic layer 510, another polymer/ceramic interface, and a second solid polymer layer 510. Several such sandwich cells were made with aluminum current collectors and using a variety of chemical additives in the solid polymer electrolyte layers 530. Table 3 shows the area specific impedance (ASI) data for the polymer-ceramic interface modified with the chemical additives (and a control with no additive) extracted from sandwich cells of LISICON and a block copolymer electrolyte.

TABLE 3

Impedance Data for Ceramic-Solid Polymer Electrolyte Sandwich Cells with Various Chemical Additives

| Additive | ASI (ohm * $cm^2$) |
|---|---|
| No Additive: Control | 3686 |
| Ethylene Carbonate | 5580 |
| Imidizolium ionic liquid | 1425 |
| PEG dimethylether | 1508 |
| Carbonate Functionalized PEG | 1212 |
| Urethane Functionalized PEG | 668 |
| 1-(Dimethylsulfamoyl) imidazole | 5359 |
| Urethane Functionalized Perfluoropolyether | 1611 |

In general, ceramic-polymer composite electrolytes that have area specific impedances between the ceramic and polymer that is less than about 2000 or 1500 ohm*$cm^2$ can be used to advantage in battery cells such as lithium battery cells.

EXAMPLES

The following examples provide details relating to composition, fabrication and performance characteristics of ceramic-polymer composite electrolytes in accordance with the present invention. It should be understood the following is representative only, and that the invention is not limited by the detail set forth in these examples.

Example 1

Figure 6:
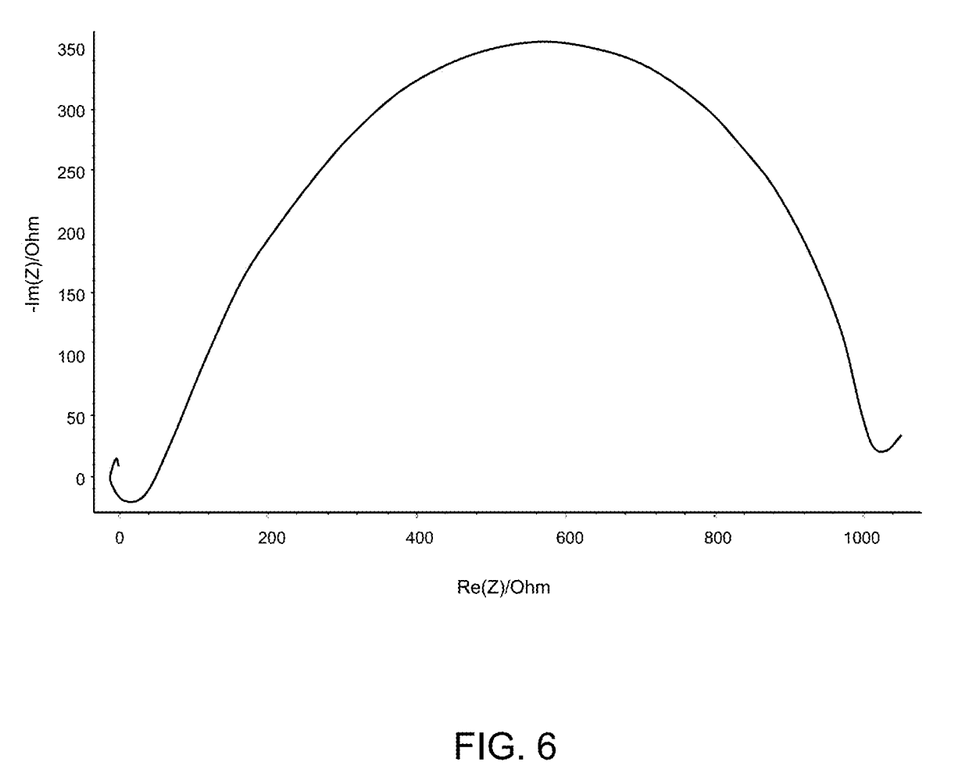
FIG. 6 is a graph that shows impedance measurements made on a ceramic-polymer composite electrolyte, according to an embodiment of the invention.

A polymer solution was made by mixing together 2.33 g of PS-PEO block copolymer and 0.66 g LiTSFI (salt) into 18 g of cyclohexanone at 60° C. until the polymer dissolved. LISICON particles were added at 55 wt. % with respect to the polymer and salt weight (1.65 g LISICON). The solution was sonicated to evenly distribute the LISICON particulates. Then the solution was coated onto a 60° C. hotplate with a doctor blade to form a film. The film was vacuum oven dried overnight at 80° C. to remove the cyclohexanone solvent. Impedance measurements were made using a BioLogic VMP-3 with a frequency range of 1000 kHz to 1 Hz. Impedance data is shown in FIG. 6, from which conductivity was derived. Conductivity values for both this (LISICON) ceramic-polymer composite electrolyte and for the same polymer electrolyte without ceramic particles are shown in FIG. 2. Clearly as more ceramic particles are added, the conductivity of the composite decreases.

Example 2

A polymer solution was made by mixing together 2.33 g of PS-PEO block copolymer and 0.66 g LiTSFI (salt) into 18 g of cyclohexanone at 60° C. until the polymer dissolved. LLTO particles were added at 55 wt. % with respect to the polymer and salt weight (1.65 g LLTO). The solution was sonicated to evenly distribute the LLTO particles. Then the solution was coated onto a 60° C. hotplate with a doctor blade to form a film. The film was vacuum oven dried overnight at 80° C. to remove the cyclohexanone solvent. Impedance measurements were made using a BioLogic VMP-3 with a frequency range of 1000 kHz to 1 Hz. Conductivity values for both this (LLTO) ceramic-polymer composite electrolyte and for the same polymer electrolyte without ceramic particles are shown in FIG. 3. Clearly as more ceramic particles are added, the conductivity of the composite decreases.

Example 3

A sandwich cell was constructed, as described above in reference to FIG. 5, to measure interfacial impedance between a ceramic disk and a polymer electrolyte. The ceramic disk was made from a LISICON powder that was pressed into a pellet using a Carver® press at 2.3 tons and was subsequently sintered at 900° C. for 12 hours. A polymer solution consisting of 2.33 g PS-PEO block copolymer, 0.66 g LiTSFI, 0.47 g urethane-functionalized PEG, and 18 g cyclohexanone was coated onto aluminum current collectors to form solid polymer electrolyte films. The solid polymer electrolyte films, with aluminum current collectors attached, were then hot pressed onto both sides of the ceramic disk. Impedance measurements were made on individual components and on the overall sandwich cell to derive the interfacial impedance between the polymer electrolyte and the ceramic disk. Area specific interfacial impedance is shown as 668 ohm*cm$^2$ in Table 3 above.

Example 4

Figure 7:
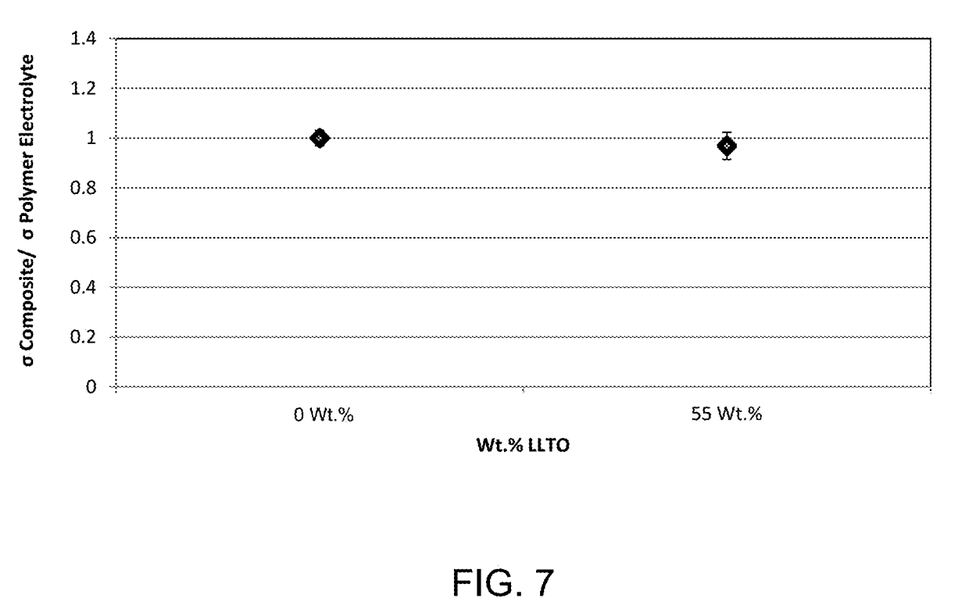
FIG. 7 is a graph that shows conductivity data for a ceramic-polymer composite electrolyte that contains solid polymer electrolyte, ionically-conductive LLTO ceramic particles, and a chemical additive.

A polymer solution was made by mixing together 2 g poly(ethylene glycol) dimethyl ether, 0.07 g LiTFSI (salt), and 0.105 g of poly(ethylene glycol) bis(carboxymethyl) ether. The solution (0.5 g) was milled into 1.5 g of LLTO to form a paste. The paste was coated onto aluminum current collectors and an impedance cell was constructed. FIG. 7 is a graph that shows conductivity data for this ceramic-polymer composite electrolyte and for the same solid polymer electrolyte without ceramic particles. It can be seen that the conductivities of the two are about the same, much in contrast to the data shown in FIG. 3. It seems that the chemical additive has reduced the interface ionic resistance between the solid polymer electrolyte matrix and the ionically-conductive LLTO ceramic particles.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrolyte material, comprising: ionically-conductive ceramic particles distributed in a matrix of ionically-conductive solid polymer, electrolyte salt, and α,ω-bis(N,N-dialkylcarbamoyl) poly(ethylene glycol) to form a ceramic-polymer composite.

2. The electrolyte material of claim 1 wherein the ionically-conductive ceramic particles comprise a material selected from the group consisting of UPON, LLTO, LATP, LISICON, LLZO, LSPS, thio-LISICON, and $Li_2S$—$P_2S_5$.

3. The electrolyte material of claim 2 wherein the ionically-conductive ceramic particles have an average diameter less than 20 μm.

4. The electrolyte material of claim 2 wherein the ionically-conductive ceramic particles have an average diameter less than 10 μm.

5. The electrolyte material of claim 2 wherein the ionically-conductive ceramic particles have an average diameter between 0.2 and 1.0 μm.

6. The electrolyte material of claim 1 wherein the ionically-conductive solid polymer is one or more selected from the group consisting of polyethers, polyamines, polyimides, polyamides, poly alkyl carbonates, polynitriles, perfluoro polyethers, fluorocarbon polymers substituted with nitriles, fluorocarbon polymers substituted with carbonates, and fluorocarbon polymers substituted with sulfones.

7. The electrolyte material of claim 6 wherein the ionically-conductive solid polymer is crosslinked.

8. The electrolyte material of claim 1 wherein the ionically-conductive solid polymer is a graft copolymer that comprises one or more selected from the group consisting of polysiloxanes, polyphosphazines, polyolefins, and polydienes.

9. The electrolyte material of claim 8 wherein the ionically-conductive solid is crosslinked.

10. The electrolyte material of claim 1 wherein the ionically-conductive solid polymer comprises block copolymers that contain ionically-conductive blocks that make up ionically-conductive phases and structural blocks that make up structural phases.

11. The electrolyte material of claim 1 wherein the weight fraction of ceramic particles in the electrolyte is between 10% and 80%.

12. The electrolyte material of claim 1 wherein the weight fraction of ceramic particles in the electrolyte is between 30% and 60%.

13. The electrolyte material of claim 1 wherein the weight fraction of ceramic particles in the electrolyte is between 50% and 55%.

14. The electrolyte material of claim 1 wherein the ceramic-polymer composite has an area specific impedance between the ionically-conductive ceramic particles and the ionically-conductive solid polymer that is less than 1500 ohm*cm$^2$.

15. The electrolyte material of claim 1 wherein the additive is selected from the group consisting of urethane functionalized poly(ethylene glycol); urethane functionalized perfluoropolyether; alkyl substituted pyridinium-based ionic liquids with TFSI, $PF_6$, or $BF_4$ anions; alkyl substituted pyrrolidinium-based ionic liquids with TFSI, $PF_6$, or $BF_4$ anions; substituted poly(ethylene glycol) with functional carbonate end groups; substituted poly(ethylene glycol) with functional nitrile end groups; dioctyl sulfosuccinate sodium, lithium, or potassium salts; poly(ethylene glycol) 4-nonylphenyl 3-sulfopropyl ether sodium, lithium, or potassium salts; sodium, lithium, or potassium dodecylbenzenesulfonate; alkyl substituted phosphonium-based ionic liquids with TFSI, $PF_6$, or $BF_4$ anions; alkyl substituted imidazolium-based ionic liquids with TFSI, $PF_6$, or $BF_4$ anions; and alkyl substituted ammonium-based ionic liquids with TFSI, $PF_6$, or $BF_4$ anions.

16. The electrolyte material of claim 1 wherein the weight fraction of the additive in the ionically-conductive solid polymer alone is between 1 and 30%.

17. The electrolyte material of claim 1 wherein the ceramic particles are precoated with a material selected from the group consisting of graphite, lithium fluoride, lithium phosphate, zirconium oxide, barium titanate, ionic surfactants, alkyl nitriles, alkyl carbonates, and alkyl sulfone functional groups.

18. The electrolyte material of claim 1 wherein the ionically-conductive ceramic particles comprise a LISICON material.

19. The electrolyte material of claim 1 wherein the ionically-conductive solid polymer comprises polystyrene polyalkyl carbonate block copolymer.

* * * * *